Jan. 19, 1971    R. J. LEE    3,555,641

TRIMMING TOOL FOR CARTRIDGE CASES

Filed Aug. 15, 1968

INVENTOR
RICHARD J. LEE

BY DONALD E. PORTER
ATTORNEY

United States Patent Office 3,555,641
Patented Jan. 19, 1971

3,555,641
TRIMMING TOOL FOR CARTRIDGE CASES
Richard J. Lee, R.R. 2, Hartford, Wis. 53027
Filed Aug. 15, 1968, Ser. No. 752,864
Int. Cl. B23p 15/22
U.S. Cl. 29—1.32                                    6 Claims

ABSTRACT OF THE DISCLOSURE

A self-aligning trimming tool for trimming the end of a spent center firing cartridge case to a standard usable length, comprising a single, rotatable cutting tool adapted to receive a plurality of trimmer guides which are sized to be inserted into various caliber cartridge cases. The trimmer guides include a narrow pin portion at the end opposite attachment to the cutting tool for automatically aligning it in the cartridge to be trimmed.

---

This invention provides a simple, self-aligning trimming tool for shortening the elongated open end of a spent rifle cartridge case. The apparatus comprises a single, annular cutting tool which is axially threaded to receive a plurality of different caliber trimmer guides.

Cutting tools for cartridge cases are known in the art. One such tool is shown in U.S. Pat. No. 3,199,168, and includes means for adjusting the length of the tool so that the cutting action is limited by the length of a guide member inserted inside the cartridge case being trimmed. However, devices of this type include a number of parts, including set screw adjusted cutting blades, and do not have simple means for accurately setting the length of the guide member and thereby, the cutting tool. Accuracy is particularly important in reclaiming cartridge cases, because the chamber of the firearm and the ejecting mechanism can jam when a reworked cartridge is overly long.

Another cartridge trimming device known to the inventor incorporates a tool which is integral with stem-like guide member. This guide member determines the length of insertion into a particular caliber cartridge case, and the device also includes a large crank to which the combination cutter-guide member is secured. It therefore is necessary to manufacture a plurality of cutting tools, each having an integral guide member. The cutting blades are the most expensive item in a trimming tool, because the steel is specially treated and machined.

The present invention provides a trimming tool for cartridge cases which avoids the disadvantages of the above described trimming tools, and is relatively inexpensive to manufacture. The inventor's device requires only a single cutting tool in combination with a plurality of guide members, each of which can be manufactured separately. Each guide member has a threaded end portion which can be inserted into a complementary, threaded opening in the cutting end of the cutting tool. By using one specially modified cutting tool, applicant greatly simplifies the manufacturing procedure for his device, and provides a trimming tool kit which is easy to use.

The inventor's device may be sold as a kit which includes a single cutting tool and a plurality of interchangeable trimmer guides, each selected for use in a particular caliber of cartridge cases to be trimmed. Interchanging of the trimmer guides is simple and can be done quickly, without the aid of any tools. Because each trimmer guide inserts into the cutting tool with no adjustment necessary to obtain a standard, fixed length cartridge case when trimmed, uniform length of all cartridge cases is assured.

Figure 1:
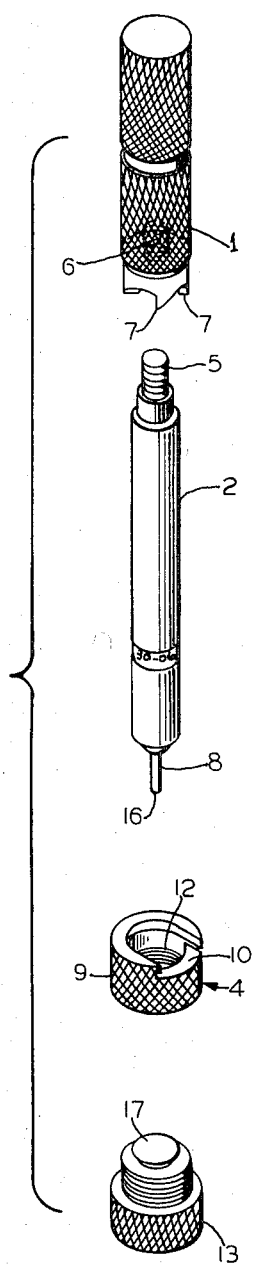
Figure 2:
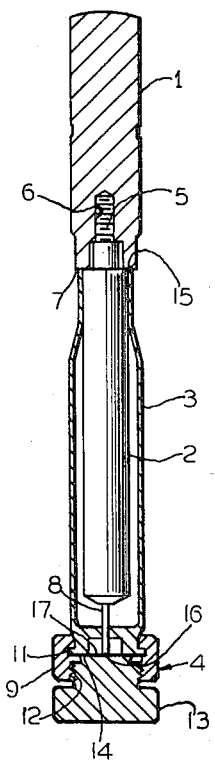

The best mode presently contemplated of carrying out the invention is illustrated in the accompanying drawings, in which:

FIG. 1 is an exploded view in perspective of the trimmer tool of the invention;
FIG. 2 is a sectional view of the apparatus shown in FIG. 1, including a cartridge case disposed around the trimmer guide.

As shown in the drawings, a specially modified cutting tool 1 is threadedly attached to a trimmer guide 2, and the trimmer guide 2 is adapted to be inserted into a cartridge case 3, held in a work holder 4. The threaded end 5 of the trimmer guide 2 is threadedly received in a threaded opening 6 disposed in cutter end 7 of the cutter tool 1. Threaded end 5 is of the same dimensions for all caliber trimmer guides 2.

The opposite end of the trimmer guide 2 terminates in a pilot pin 8 to insure alignment of the trimmer guide 2 in the cartridge case 3 during the cartridge case trimming operation. The pilot pin 8 is inserted in the end of the cartridge case 3 after the spent primer (not shown) has been removed.

Shell holder 4 comprises a ring-shaped, knurled member 9 having side insertion slot 10 for inserting the lip 11 of a cartridge case 3. The knurled member 9 includes a threaded opening 12, into which is inserted a threaded plug member 13. The holder 4 is tightened down on the cartridge lip 11 to hold the cartridge case 3 in place, and limits the trimming action of the cutting tool 1.

The cartridge case 3 to be trimmed includes an axial opening 14, from which the spent primer has been removed. For trimming a cartridge case 3, the trimmer guide 2 is inserted into the spent cartridge case 3 so that the pin 8 fits into the opening 14 for axial alignment, and to insure uniform trimming. The tool is then rotated manually relative to the cartridge case 3 and is axially guided by flash opening 15 and the axial opening 14 of the cartridge 3 so that when the cutting operation is completed, end 16 of trimmer guide 2 bottoms against the inner surface 17 of the holder 4, and no further cutting is possible.

The device of this invention has particular appeal to the amateur sportsman because of its simplicity and ease of operation, combined with a high degree of accuracy. Interchangeability of the trimmer guide 2 makes it possible to readily change from trimming one size cartridge case to another in the matter of seconds, and use of fixed size trimmer guides eliminates all guesswork regarding the amount of trimming required.

Various modifications of the invention are contemplated as being within the scope of the following claims which particularly point out and distinctly claim the subject matter which is regarded as invention.

I claim:
1. A device for trimming the open end of a tubular member comprising, in combination,
   a cutting tool having a peripheral cutting edge to engage and trim an open end of the tubular member, and having a threaded axial opening in the same end thereof as the peripheral cutting edge, and
   a cylindrical trimmer guide for insertion in the tubular member, said trimmer guide conforming in size to the inner diameter of the tubular member, and having a threaded stud end and a second end with the threaded end adapted for threaded engagement in the threaded axial opening in the cutting tool, the second end including means for axially positioning the device in the tubular member.

2. The device of claim 1, and stop means for limiting the axial movement of said cutting tool, whereby said tubular member may be trimmed to a uniform, predetermined length.

3. The device of claim 1, in which the means for axially positioning the device in the tubular member is a pilot pin.

4. The device of claim 2, in which the stop means define a hand-held vise means for holding the tubular member against rotation to insure relative rotation of the tubular member and the cutting tool, and for providing a stop surface for the pilot pin to determine the length of the trimmed tubular member.

5. A device for trimming a spent cartridge case prior to reloading comprising,
    a cylindrical cutting tool having an annular cutting end,
    a threaded axial opening disposed in the same end of the cutting tool as the annular cutting end,
    a plurality of interchangeable trimmer guides, each having a threaded end which is adapted to be threadedly received in the threaded axial opening in the cylindrical cutting tool, and each being a predetermined length and diameter, whereby the same cutting tool can be utilized for trimming a plurality of different caliber cartridge cases by interchanging trimmer guides:

6. The device of claim 5, including stop means for limiting the axial movement of said trimmer guide and said cutting tool.

References Cited

UNITED STATES PATENTS

| | | | |
|---|---|---|---|
| 2,359,954 | 10/1944 | Whipple | 29—1.32X |
| 3,137,914 | 6/1964 | Manshel | 29—132 |
| 3,174,390 | 3/1965 | Jacobsen | 29—1.32X |
| 3,199,168 | 8/1965 | Rhine | 29—1.32 |
| 3,251,114 | 5/1966 | Lewis | 29—1.32 |

JOHN F. CAMPBELL, Primary Examiner

R. J. CRAIG, Assistant Examiner

U.S. Cl. X.R.

29—1.3, 1.31; 86—10; 102—43